Patented Nov. 2, 1937

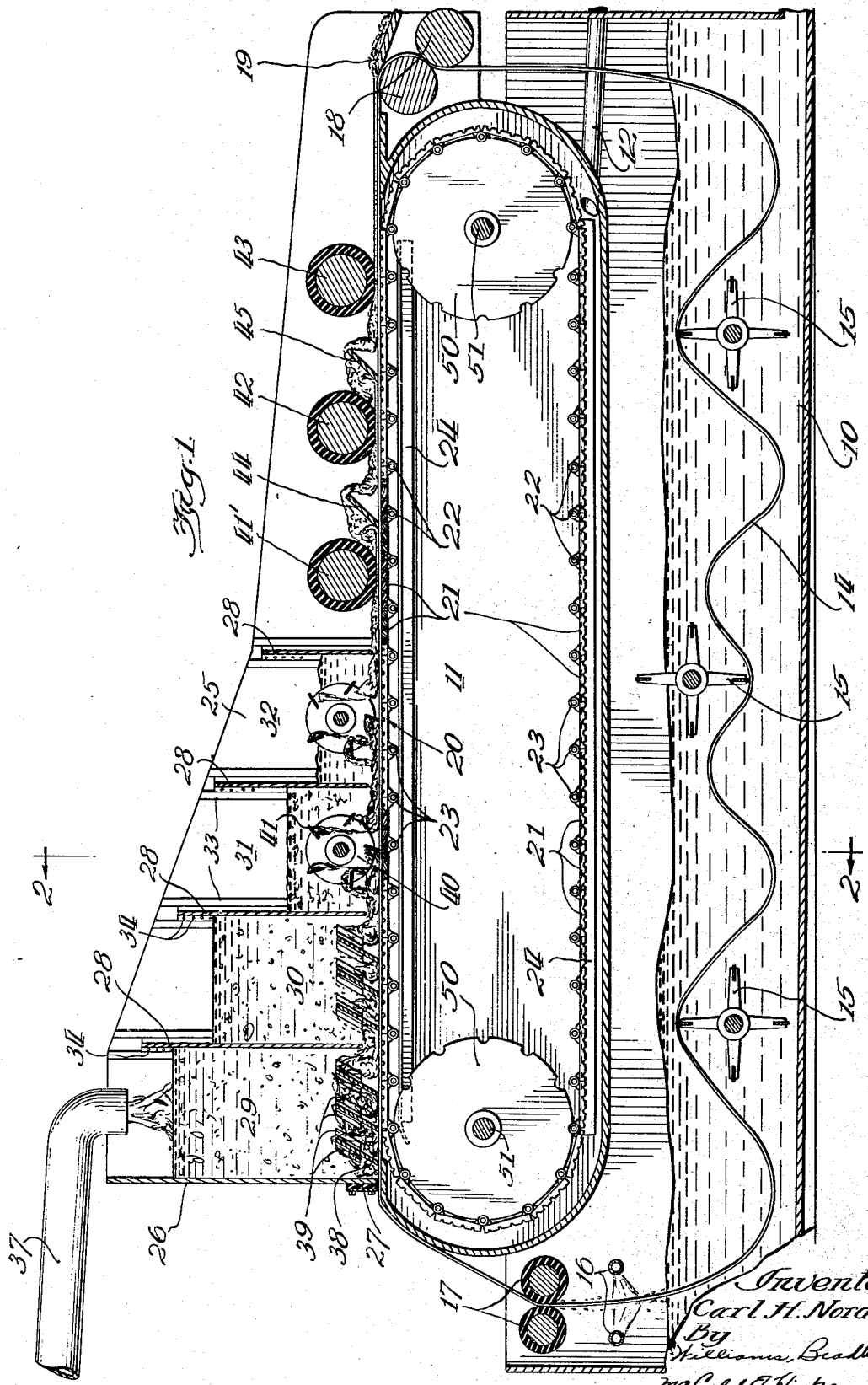

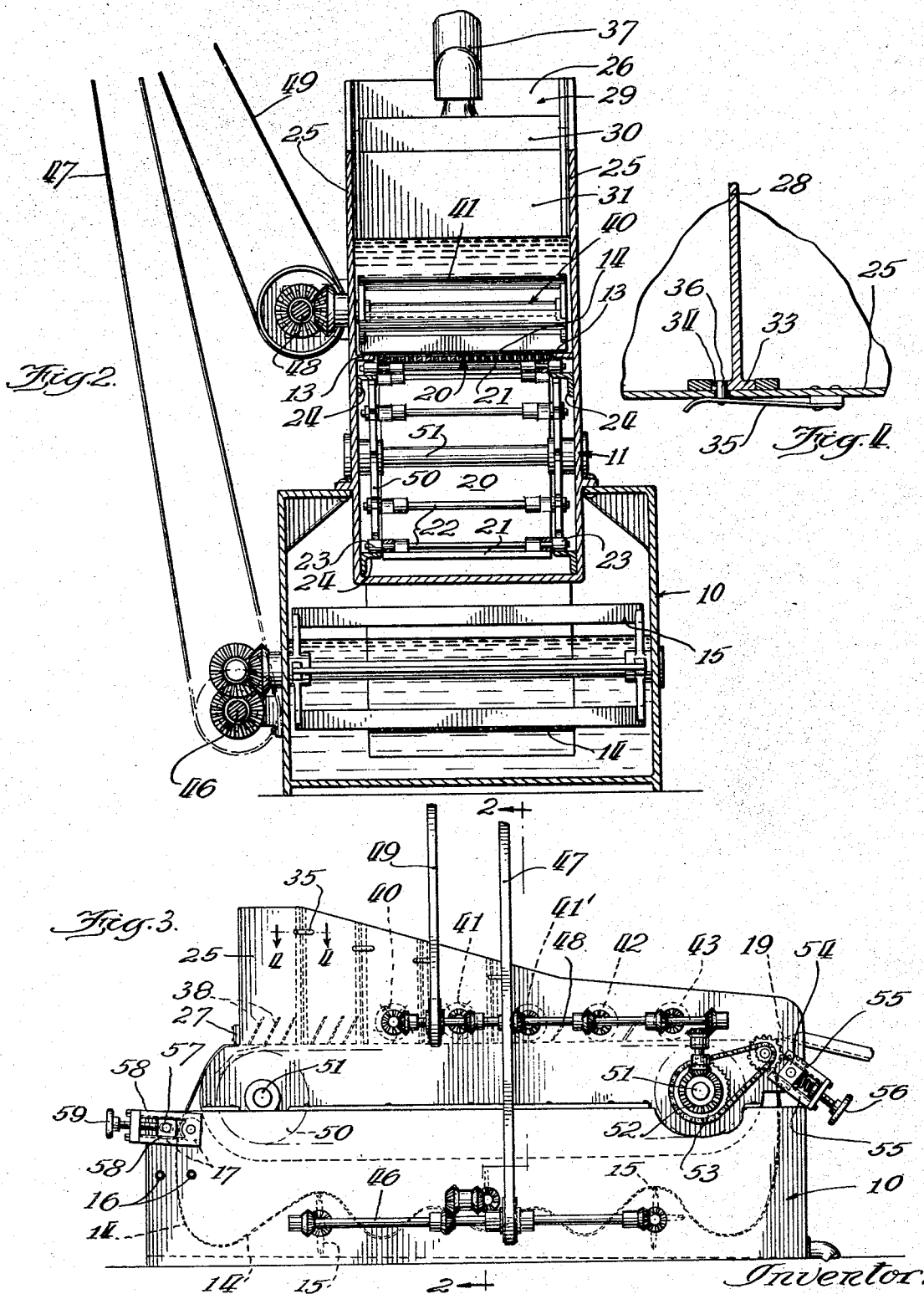

2,097,529

UNITED STATES PATENT OFFICE 2,097,529

FILTER

Carl H. Nordell, Chicago, Ill., assignor to Advance Engineering Company, Chicago, Ill., a corporation of Illinois Application December 26, 1934, Serial No. 758,376

3 Claims. (Cl. 210—193)

This invention relates to filters, and particularly to filters adapted to filter liquid from solid matter which tends to choke the filter medium to a substantial extent.

The filter of the present invention is adapted for the filtration of colloidal materials and sludges generally, and is particularly applicable for use in the filtration of sewage sludges.

The present invention will readily be understood from the following description of a particular embodiment thereof, taken in conjunction with the accompanying drawings, in which Figure 1 is a sectional elevation through a filter embodying my invention;

Fig. 2 is a transverse elevational section thereof, the section being taken on the line 2—2 of Fig. 1;

Fig. 3 is a side elevation of the filter on a smaller scale showing, in particular, the drive mechanism; and Fig. 4 is a sectional detail view taken on the line 4—4 of Fig. 3, showing the manner in which the partitions may be adjusted.

Referring to the drawings, the filter is built on a washing tank 10 which serves as the base of the machine. Upon the upper face of the tank 10 is supported an elongated vacuum chamber 11, the outlet 12 of which is connected to suitable vacuum creating apparatus (not shown) for the purpose of drawing liquid through the filter medium and from the chamber 11. The upper face of the chamber 11 is open and a lateral longitudinal flange 13 is provided along this opening for the purpose of receiving the filter fabric 14 which is somewhat wider than the opening in the top of the chamber 11.

The filter fabric 14 is in the form of a continuous belt which extends over the open face of the vacuum chamber 11 and extends around the vacuum chamber in the manner shown in Fig. 1. The length of the fabric belt 14 is sufficient that the lower length thereof is immersed in the tank 10 and is in a state of freedom therein, which enables thorough cleansing to be effected.

I provide in the tank 10 a plurality of beaters 15 which are rotated so as to beat the fabric 14 while it passes through the tank. I prefer to provide beaters 15 which act on both sides of the fabric, and as will be understood from Fig. 1, I prefer to drive some of the beaters in one direction and some in the other direction. As will appear from Fig. 1, the tank 10 contains enough washing fluid effectively to treat the belt passing therethrough. The washing fluid normally used is water. After being washed in the tank the belt ascends upwardly towards the open face of the chamber 11. It is preferably finally cleansed by water sprayed against it from pipes 16 and is thereafter run between rollers 17.

After it has passed over the open face of the vacuum chamber 11 it moves downwardly between two friction rolls 18 which aid in the circulatory movement of the belt. A knife or scraper 19 is provided for removing solid material from the belt before it passes downwardly into the washing tank 10.

While passing over the open face of the vacuum chamber 11, the fabric 14 must be supported in order to withstand the very considerable pressure exerted on the large open face. To take this pressure I provide a moving support which is strong enough to withstand the pressure and at the same time is free to move, or is driven to move in the same direction as the fabric. In the embodiment of the invention illustrated, this support is provided by a moving conveyor 20 which comprises perforated plates 21 of the same length as the width of the opening in the face of the chamber 11. In operative position the plates 21 are located in this opening. The plates 21 are pivotally connected in series by means of bars 22 which pass through bearings carried on the inner side of the plates. The bars 22 are provided at each end with rollers 23 and the chamber 11 is provided with longitudinal rails 24 on each side adjacent the open face of the chamber upon which the rollers 23 bear. Thus it will be seen that the pressure of the air acting on the fabric is transmitted to the plates 21, and by them transmitted to the rolls 24. The plates 21 are provided with superficial grooves from which perforations extend into the inner face of the plates. It will be understood that liquid passing through the filter fabric 14 passes through these grooves and perforations into the chamber 11.

On each side of the fabric 14 the tank 11 is provided with upstanding walls 25 which, in general, decrease in height towards the rear of the filter, this circumstance being due to the fact that the water passes through the fabric as the belt moves over the open face of the chamber 11. At the front end of the filter the walls 25 are connected by a transverse wall 26. The wall 26 terminates slightly above the top surface of the chamber 11 so as to permit the filter fabric 14 to pass under this wall. A sealing member 27 of rubber or other suitable flexible material may be provided to bear against the top of the fabric and provide a watertight seal at this location. A plurality of partitions 28 extend between the walls 25 so as to divide the space above the open face of the chamber 11 into a series of chambers 29, 30, 31, and 32. The lower end of the partitions 28 are located some distance above the filter fabric 14 so that liquid may pass through chambers 29, 30, 31, and 32 in series. The spacing of the partitions 28 from the filter fabric should be such that a substantial amount of liquid is retained in each compartment. The partitions 28 are preferably regulable in height, which may suitably be provided in the manner shown in Fig. 4.

According to the construction shown in this figure, each partition 28 is provided at each side with a flange 33. The flange 33 carries a series of openings 34. On its exterior, the wall 25 has mounted a spring 35 which carries a pin 36 which extends through an opening in the wall 25. This opening is located in vertical alignment with respect to the openings 34. It will readily be understood that the height of the partition 28 can be adjusted by retracting the spring 35 to bring the pin 36 out of the opening 34 in which it is located. The partition is then moved in the desired direction and the most appropriate opening 34 is brought into alignment with the pin 36. The spring 35 is then released to allow the pin 36 to enter that opening.

The material to be filtered is supplied to the first compartment 29 by means of a supply pipe 37. The compartment 29 is provided with a plurality of scrapers 38 which bear against the top surface of the filter fabric 14. These scrapers are preferably directed somewhat oblique against the direction of movement of the filter fabric 14 and they may suitably be supported by guides 39 mounted on the walls 25 and they may bear against the filter fabric 14 by their own weight. I may provide similar scrapers in the compartment 30. In the compartments 31 and 32 I may provide agitating means such as rotating beaters 40, which carry scraping blades 41. The function of the scrapers 38 is to elevate deposit from the filter fabric 14 and present a clear surface for the passage of liquid through the filter fabric. The beaters 40 have the same effect since the scraping blades 41 positively remove deposit from the filter fabric. In addition, the beaters 40 keep the deposit in suspension owing to the rotary movement which they impart to the liquid in the compartments 31 and 32. It may here be convenient to remark that the proper height of the partitions 28 is such that a substantial amount of fluid is maintained in each compartment 29, 30, 31, and 32 without over-flowing. However, it is preferred to have the top of the partitions 28 somewhat below the top edge of the wall 25 at the particular location so that any over-flow which may occur may take place from one compartment to the next without spilling over the side walls 25.

It will readily be understood that a very substantial amount of the liquid is withdrawn from the material being filtered below the compartments 29, 30, 31, 32. The material passing from the compartment 32 is normally in the state of a thick mud. This material is passed under pressure rollers 41', 42 and 43 in series, which have the effect of pressing a certain amount of liquid from the deposit through the filter fabric 14. Between the pressure rollers 41' and 42, and 42 and 43, I provide scrapers 44 and 45, respectively, which have the effect of stirring up the deposit and presenting the same to the filter fabric in an advantageous manner for the squeezing therefrom of further liquid. The deposit passing beneath the pressure roller 43 is removed from the filter fabric by the knife 19 as hereinbefore mentioned.

Referring now particularly to Fig. 3, it is to be noted that the beaters 15 may be driven from a shaft 46 actuated by means of a belt 47. The beaters 15 are operated from this shaft by means of bevel gearing. The beaters 40 and the pressure rolls 41', 42 and 43 may be driven through bevel gearing from a shaft 48, which in turn is driven by a belt 49. The conveyer 20 passes over sprocket wheels 50, which are supported on shafts 51 journaled in the side walls of the chamber 11. One of these shafts 51 is provided outside the chamber 11 with a bevel gear 52 whereby it may be driven from the shaft 48. This shaft 51 also carries a sprocket wheel 53 outside the chamber 11, which sprocket wheel may be employed to drive one of the rolls 18. The other roll 18 may be journaled in blocks 54 mounted in guides 55. The pressure between the rollers 18 may be controlled by means of a hand wheel 56. One of the rolls 17 is likewise mounted in blocks 57 which are slidably mounted in guides 58. The pressure between the ringer roll 17 may be controlled in the same manner by means of hand wheels 59.

It will thus be understood that I have provided a filter in which the deposit is agitated and elevated from the filtering medium, and in which the deposit is further compressed against the filter medium for the purpose of forcing liquid therefrom. I have provided means for continuously and effectively washing the filter fabric so that materials which have heretofore presented great difficulty in filtering, can now be efficiently and continuously filtered.

While I have described the invention in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A filter having a filtering position and comprising a continuous web of fabric, a movable conveyer for moving said fabric past said filtering position, means for supplying liquid to be filtered in said position to the fabric, and means in said position for agitating said liquid and the cake deposited therefrom upon the filter fabric.

2. A filter comprising a filter fabric, means for moving the fabric, means above the fabric defining a plurality of chambers, means for supplying liquid to be filtered to said chambers in series, and means within the chambers for removing deposit from the fabric and working the deposit as the fabric passes below said chambers.

3. A filter comprising a vacuum chamber having an open face, a conveyer in said open face, a filter fabric supported on said conveyer, said fabric being in the form of a continuous web, a tank through which said web passes freely, means in said tank for beating and washing the fabric in a free condition as it passes therethrough, means for retaining liquid to be filtered above the fabric on the conveyer, and means above said fabric for breaking up during filtering, any cake deposited thereon.

CARL H. NORDELL.